United States Patent [19]

Ziegenfus et al.

[11] 4,132,174
[45] Jan. 2, 1979

[54] DRIVERLESS VEHICLE SHUTTLE

[75] Inventors: Barry L. Ziegenfus, Saylorsburg; Russell H. Scheel, Easton, both of Pa.

[73] Assignee: S I Handling Systems, Inc., Easton, Pa.

[21] Appl. No.: 731,871

[22] Filed: Oct. 13, 1976

[51] Int. Cl.² .................... B61J 1/10; B60S 13/02
[52] U.S. Cl. ............................... 104/48; 104/50; 104/166
[58] Field of Search ............ 104/48, 50, 35, 36, 104/166; 198/412

[56] References Cited

U.S. PATENT DOCUMENTS

| 189 | 5/1837 | Myers | 104/50 X |
|---|---|---|---|
| 423,872 | 3/1890 | Judson | 104/166 |
| 1,378,168 | 5/1921 | Cole | 104/48 X |
| 2,292,763 | 8/1942 | Lennox | 104/48 |
| 3,118,393 | 1/1964 | Ohlin | 104/166 |
| 3,189,158 | 6/1965 | Lucas | 198/412 X |
| 3,356,040 | 12/1967 | Fonden | 104/166 |
| 3,818,837 | 6/1974 | Jacoby et al. | 104/166 |
| 3,858,626 | 1/1975 | Ribordy | 104/166 |
| 4,041,873 | 8/1977 | Jones | 104/35 |

Primary Examiner—Albert J. Makay
Assistant Examiner—Randolph A. Reese
Attorney, Agent, or Firm—Seidel, Gonda & Goldhammer

[57] ABSTRACT

A shuttle vehicle reciprocates between sets of tracks for driverless vehicles. The linear movement of the shuttle vehicle causes a turntable on the shuttle vehicle to rotate. The turntable is adapted to support a driverless vehicle to be transported from one set of tracks to another.

2 Claims, 4 Drawing Figures

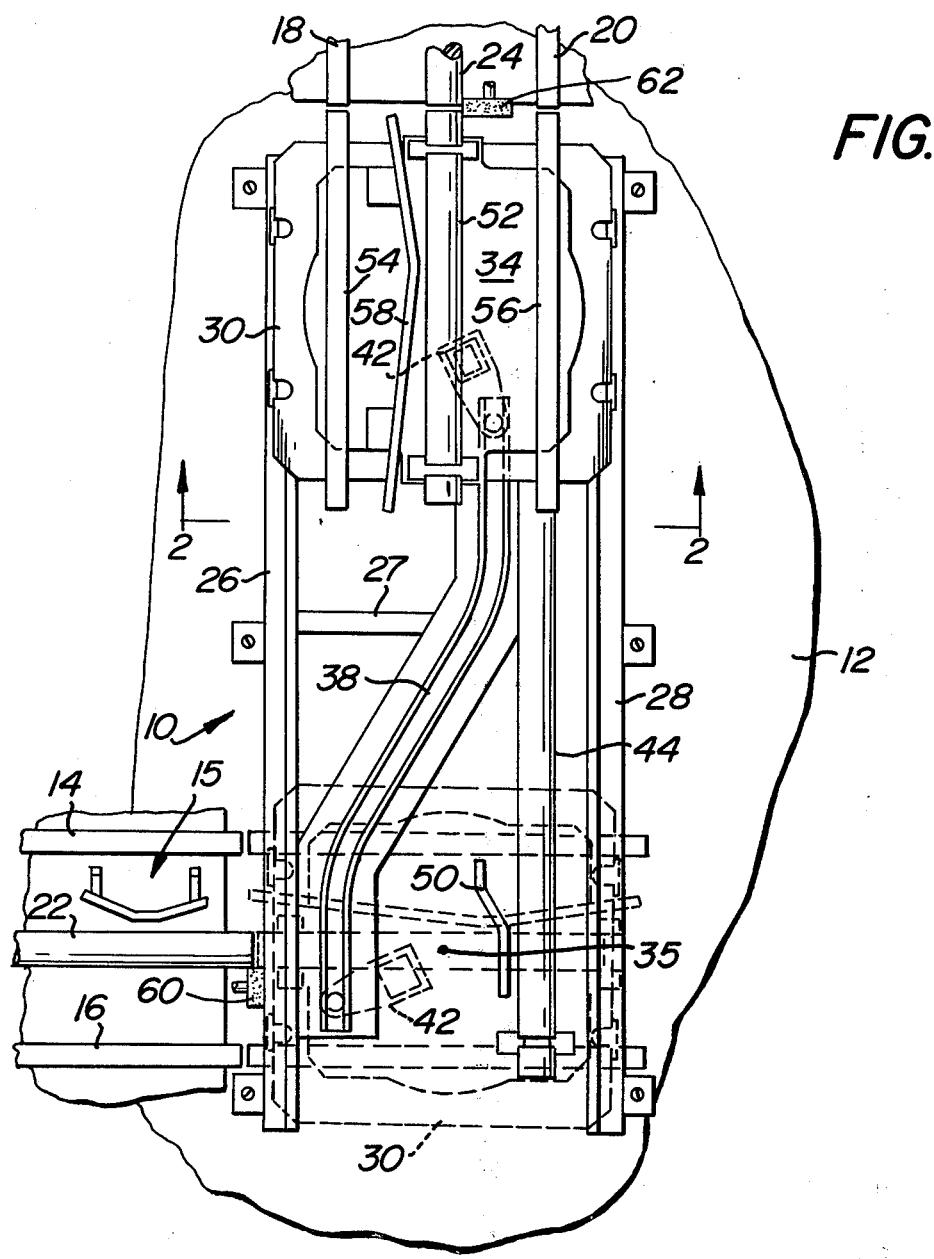

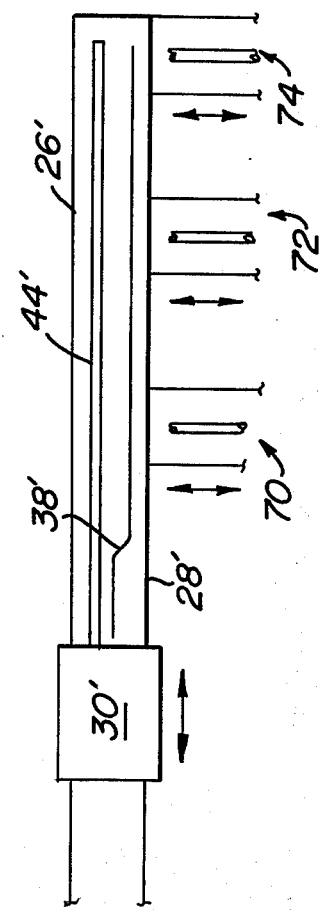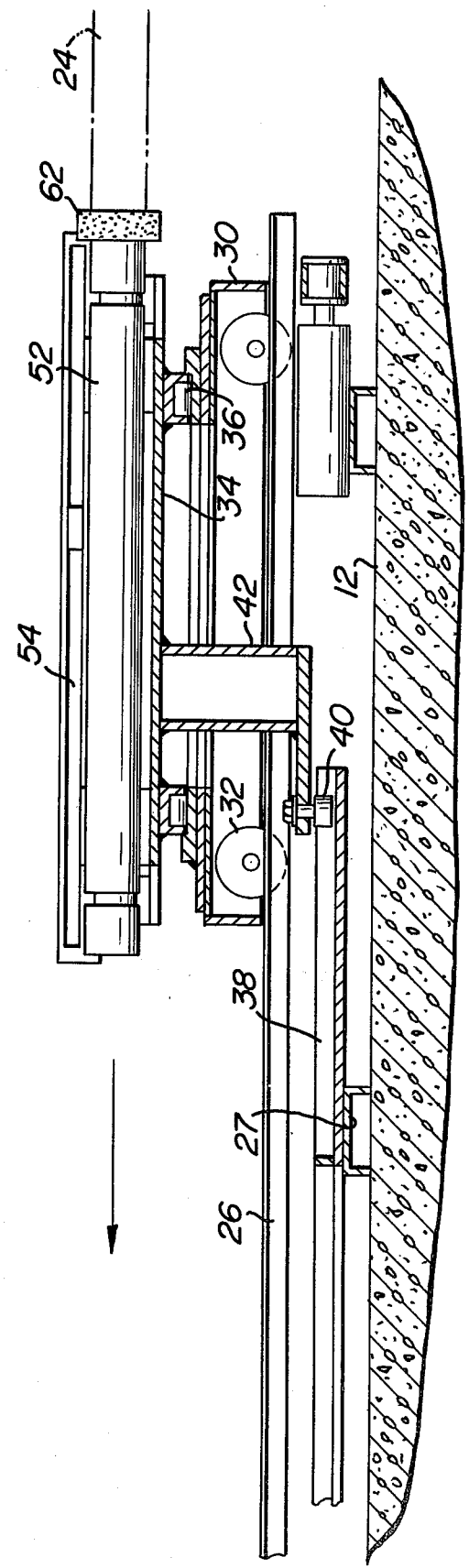

DRIVERLESS VEHICLE SHUTTLE

BACKGROUND

Turntables for transporting a vehicle between two sets of tracks are known. When it is desired to transfer a vehicle between two sets of tracks, and the included angle between the tracks is other than 90 degrees, turntables become impractical. Also, if it is desired to transfer a vehicle from one set of tracks to two or more sets of intersecting tracks, or vice versa, a turntable is required at each of the intersections to change the direction of the vehicle.

SUMMARY OF THE INVENTION

The present invention is directed to a driverless vehicle shuttle, and more particularly, to apparatus which includes a shuttle vehicle mounted on tracks for movement therealong. A motor means is coupled to the vehicle to cause the vehicle to reciprocate along the tracks. A turntable is supported by the shuttle vehicle for rotation relative to the shuttle vehicle. A means is provided on the turntable for supporting a driverless vehicle. Also, a means is provided for converting the linear movement of the shuttle vehicle to rotary movement of the turntable. Hence, a separate drive motor for rotating is not required.

It is an object of the present invention to provide a novel driverless vehicle shuttle.

It is another object of the present invention to provide a vehicle shuttle wherein the linear movement of a shuttle vehicle is utilized to rotate a turntable on the shuttle vehicle.

Other vehicles will appear hereinafter.

For the purpose of illustrating the invention, there is shown in the drawings a form which is presently preferred; it being understood, however, that this invention is not limited to the precise arrangements and instrumentalities shown.

FIG. 1 is a top plan view of apparatus in accordance with the present invention.

FIG. 2 is a sectional view taken along the line 2—2 in FIG. 1.

FIG. 3 is a sectional view taken along the line 3—3 in FIG. 2.

FIG. 4 is a schematic top plan view of an alternative embodiment.

Referring to the drawing in detail, wherein like numerals indicate like elements, there is shown in FIG. 1 a driverless vehicle shuttle in accordance with the present invention designated generally as 10 mounted on a support surface such as floor 12. Tracks 14 and 16 terminate adjacent one end of the shuttle 10. Tracks 18 and 20 terminate adjacent another end of the shuttle 10. A drive shaft 22 is provided between the tracks 14 and 16. A drive shaft 24 is provided between the tracks 18 and 20. Shuttle 10 is adapted to transfer a vehicle from movement along tracks 14, 16 to movement along tracks 18, 20. Tracks 14 and 16 are preferably provided with a control member 15 such as that in U.S. Pat. No. 3,903,810.

The type of driverless vehicle adapted to be used with the apparatus of the present invention is known to those skilled in the art. The driverless vehicles are preferably of the type disclosed in U.S. Pat. Nos. 3,818,837 and 3,356,040 wherein a drive wheel on the vehicle is in contact with the rotating drive shaft. The angular disposition between the drive wheel on the driverless vehicle and the associated drive shaft determines the speed of movement of the vehicle.

The vehicle shuttle 10 includes a pair of parallel tracks 26 and 28 interconnected at spaced points therealong by transversely disposed struts 27 mounted on the floor 12. A shuttle vehicle 30 is provided with wheels 32. The wheels 32 ride on the tracks 26, 28. It will be noted that the tracks 26 and 28 are a finite length and extend from a position adjacent tracks 14 and 16 to a position adjacent tracks 18 and 20.

A turntable 34 is rotatably supported on the upper surface of the shuttle 30 by bearings 36. See FIG. 3. A cam track 38 is mounted on the floor 12 between the tracks 26 and 28. A cam follower 40 is disposed in the cam track 38 and is supported by an arm 42. Arm 42 is connected to the turntable 34 at a location spaced from the axis of rotation of turntable 34 designated 35. As shown more clearly in FIG. 3, the shuttle vehicle 30 has a large opening through which the arm 42 extends.

A drive shaft 44 is supported for rotation about its longitudinal axis. Shaft 44 is disposed between track 28 and the cam track 38. Drive shaft 44 is parallel to tracks 26, 28. A motor 48 is coupled to the drive shaft 44 for rotating the same in opposite directions. Motor 38 is coupled to reversing limit switches adjacent opposite ends of the tracks 26, 28. The shuttle vehicle 30 rotatably supports a drive wheel 46 in rolling contact with the shaft 44. Drive wheel 46 is similar to the drive wheel shown in the above-mentioned patents and is preferably biased to a position wherein the axis of rotation of wheel 46 is at an angle of approximately 45 degrees with respect to the longitudinal axis of shaft 44. Adjacent each end of the drive shaft 44, there is provided an angled cam member 50 for rotating the drive wheel 46 to a position wherein the axis of rotation of wheel 46 is within a few degrees of the axis of shaft 44 whereby the shuttle vehicle 30 will come to a halt.

The turntable 34 is provided with a drive shaft 52 between parallel tracks 54, 56. Track 54 in the position shown in FIG. 1 is aligned with track 18 while track 56 is aligned with track 20. As shown in phantom at the bottom of FIG. 1, track 56 is adapted to be aligned with track 14 while track 56 is adapted to be aligned with track 16. A control member 58 is supported by the turntable 34 adjacent the drive shaft 52. Control member 58 has end portions which converge toward a central portion disposed parallel to the axis of shaft 52. The control member 58 causes a vehicle to come to a stop while supported by tracks 54, 56. Control member 58 may be of the type disclosed in U.S. Pat. No. 3,903,810. A conventional friction coupling 60 is provided for transmitting the rotary motion of drive shaft 22 to the drive shaft 52 when they are aligned with one another. This permits a driverless vehicle to be driven onto the turntable 34 and then stopped thereon. A conventional friction coupling 62 is provided for coupling the drive shaft 52 to the drive shaft 24 to thereby rotate drive shaft 52 in a manner to cause the vehicle to transfer off the turntable onto the tracks 18, 20 and for propulsion therealong by drive shaft 24.

Cam track 38 as illustrated causes the turntable 34 to rotate 90 degrees. Other arcs less than 360 degrees such as 45 degrees are attainable. Cam track 38 may be easily designed in two stages when it is desired to cause the turntable 34 to rotate through an arc of 180 degrees whereby the driverless vehicle will exit in a direction opposite to that in which it entered the turntable 34.

As shown in FIG. 4, shuttle vehicle 30' having a turntable thereon as described above may be utilized to transfer a driverless vehicle to any one of a plurality of sets of parallel tracks 70, 72, 74 each having a drive shaft between the tracks. The sets of tracks 70–74 are each perpendicular to tracks 26', 28'. As described above, a cam track 38' and drive shaft 44' are located between the tracks 36', 38'. Vehicle 30' may transfer driverless vehicles from tracks 70 to tracks 72 or 74 and vice versa.

The apparatus of the present invention is utilized as follows:

Driverless vehicles of the type disclosed in the above-mentioned patents are transferred by drive shaft 22 off the end of tracks 14, 16 onto the turntable 34. A limit switch or equivalent device, not shown, on the turntable 34 will be tripped by the vehicle as the vehicle comes to a halt on the turntable 34. The said switch reactivates control member 15 and starts motor 48 which causes the shuttle vehicle 30 to move along the tracks 26, 28. All additional vehicles will be stopped by member 15. As the shuttle vehicle 30 is driven due to the relationship between drive shaft 44 and drive wheel 46, the linear movement of the shuttle vehicle 30 is utilized to rotate the turntable 34 by way of cam follower 40 and its cooperation with the cam track 38.

When the shuttle vehicle 30 reaches the end portions of tracks 26, 28, it will trip a limit switch or equivalent device not shown, which stops the motor 48. At this point, the turntable 34 has rotated through the predetermined arc so as to align the discharge end of the tracks 54, 56 with the tracks 18, 20, respectively. Rotary driving force is transmitted by coupling 62 from drive shaft 24 to drive shaft 52. Rotation of shaft 52 causes the vehicle to discharge from tracks 54, 56 onto tracks 18, 20.

After a vehicle has discharged, a control device which may include a timer, starts the motor 48 which rotates the drive shaft 44 in an appropriate direction so as to cause the shuttle vehicle 20 to return to its start position or move to new position. As the shuttle vehicle 30 returns to its start position adjacent tracks 14, 16, the turntable 34 again rotates through the predetermined arc so that it may receive a new vehicle. As the shuttle vehicle approaches its start position, cam 50 will contact the drive wheel 46 and rotate the same so as to cause the shuttle vehicle 30 to halt in a position for receiving a new vehicle. At the same time, the shuttle vehicle 30 will contact a limit switch or equivalent device, not shown, to shut off motor 48 and deactivate member 15 so that the process can automatically repeat.

The limit switches may alternatively control a clutch between motor 48 and the drive shaft 44. Motor 48 is preferably of the reversing type whereby each time it is activated, it operates in an opposite direction. The rack and pinion or other equivalent device may be substituted for cam track 38 and follower 40.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for transporting a driverless vehicle between a pair of vehicle incoming tracks and a pair of vehicle outgoing tracks comprising:

(a) first and second shuttle tracks, a drive shaft between said shuttle tracks, said drive shaft being closer to said first shuttle track than to said second shuttle track, motor means coupled to said drive shaft for causing a shuttle vehicle to reciprocate along said shuttle tracks, (b) a shuttle vehicle mounted on said shuttle tracks, a rotatable drive wheel on said shuttle vehicle, said drive wheel being in rolling contact with said drive shaft, a turntable supported from below by said shuttle vehicle for rotation about a vertical axis, spaced track means on said turntable for supporting a vehicle, a drive shaft on said turntable between said spaced track means, means on said turntable for stopping a vehicle on the turntable, said shuttle vehicle having an opening in the central portion thereof, an arm connected to said turntable for rotation therewith and extending downwardly through said opening in all positions of said turntable, said arm being spaced from the axis of rotation of said turntable.

(c) cam means for converting linear movement of the shuttle vehicle along said shuttle tracks to rotary movement of the turntable, said cam means including a portion angled with respect to said first and second shuttle tracks, said angled portion of the cam means being between said first mentioned drive shaft and said second shuttle track, and said arm supporting a cam follower which cooperates with said cam means to cause said rotary movement of said turntable.

2. Apparatus in accordance with claim 1 wherein said cam means includes a first portion disposed generally parallel to said first mentioned drive shaft and extending from one end of said angled portion, said cam means including a second portion disposed generally parallel to said first mentioned drive shaft and extending from the other end of said angled portion, whereby said cam follower may move along the first portion to the angled portion and then to the second portion, and the angled portion of said cam means rotating said turntable as the shuttle vehicle moves along the portion of said shuttle tracks adjacent said angled portion.

* * * * *